United States Patent
Maschat et al.

(10) Patent No.: US 9,453,523 B2
(45) Date of Patent: Sep. 27, 2016

(54) CRAMPING FASTENER DEVICE

(71) Applicant: A RAYMOND ET CIE, Grenoble (FR)

(72) Inventors: Kevin Maschat, Rheinfelden (DE); Sven Binkert, Lorrach (DE)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 14/692,142

(22) Filed: Apr. 21, 2015

(65) Prior Publication Data
US 2015/0300388 A1    Oct. 22, 2015

(30) Foreign Application Priority Data
Apr. 22, 2014   (FR) ..................................... 14 53602

(51) Int. Cl.
| | |
|---|---|
| *F16B 2/24* | (2006.01) |
| *B60R 21/20* | (2011.01) |
| *F16B 21/08* | (2006.01) |
| *F16B 1/00* | (2006.01) |

(52) U.S. Cl.
CPC .............. *F16B 2/243* (2013.01); *B60R 21/20* (2013.01); *F16B 21/086* (2013.01); *F16B 1/0071* (2013.01)

(58) Field of Classification Search
CPC ........ F16B 2/243; F16B 2/24; F16B 21/086; F16B 1/0071; F16B 21/082; F16B 21/08; Y10T 24/304; Y10T 24/307; Y10T 403/606; Y10T 403/70; B60R 21/20; B60R 13/02
USPC .................. 24/458, 293, 294, 581.1, 581.11; 411/508
See application file for complete search history.

(56) References Cited

U.S. PATENT DOCUMENTS

| | | | | | |
|---|---|---|---|---|---|
| 4,760,495 | A | * | 7/1988 | Till ....................... | F16B 5/0233 174/138 D |
| 4,925,351 | A | * | 5/1990 | Fisher ................... | F16B 37/043 411/182 |
| 5,259,689 | A | * | 11/1993 | Arand ................... | F16B 21/065 403/16 |
| 5,873,690 | A | * | 2/1999 | Danby .................. | F16B 37/043 411/182 |
| 6,355,044 | B1 | * | 3/2002 | Hair ...................... | A61B 17/688 606/326 |
| 6,616,479 | B1 | * | 9/2003 | Jones ................... | F16B 19/1081 411/48 |
| 7,188,393 | B2 | * | 3/2007 | Kawai ................. | B60R 13/0206 24/297 |
| 8,016,530 | B2 | * | 9/2011 | Johnson .................. | F16B 5/065 411/173 |
| 8,650,722 | B2 | * | 2/2014 | Hosoya ............... | B60R 13/0206 24/289 |
| 9,086,086 | B2 | * | 7/2015 | Bentrim .................. | F16B 21/20 |
| 2004/0175250 | A1 | * | 9/2004 | Yoneoka ............. | F16B 19/1081 411/45 |

(Continued)

FOREIGN PATENT DOCUMENTS

| | | |
|---|---|---|
| DE | 102004025698 A1 | 12/2005 |
| DE | 102011010141 A1 | 8/2012 |
| EP | 2687731 A1 | 1/2014 |

*Primary Examiner* — Robert J Sandy
*Assistant Examiner* — Rowland Do
(74) *Attorney, Agent, or Firm* — Dickinson Wright PLLC

(57) ABSTRACT

A cramping fastener device for assembling a part (7) to a support portion (18) is provided. The cramping fastener device includes a fastener clip which includes a deformable catch element that defines a cramping face (12). The catch element is designed to be pushed through the part and through the support portion and is designed to have a cramping face that is resiliently retractable into the clip. The cramping fastener device further includes a proper-assembly indicator (4) for checking that the clip is properly assembled in the cramping position. The proper-assembly indicator is in the form of a sort of stud that is constrained to retract under the effect of the cramping face retracting so as to be able to start being pushed into the clip.

9 Claims, 3 Drawing Sheets

(56) References Cited

U.S. PATENT DOCUMENTS

| | | | | |
|---|---|---|---|---|
| 2004/0244156 | A1* | 12/2004 | Jackson, Jr. | B60R 13/0206 24/295 |
| 2008/0286066 | A1* | 11/2008 | Paquet | F16B 37/043 411/177 |
| 2009/0242715 | A1* | 10/2009 | Kosidlo | F16B 2/243 248/231.81 |
| 2011/0116890 | A1* | 5/2011 | Okada | F16B 5/0642 411/358 |
| 2013/0243523 | A1* | 9/2013 | De Jong | B60R 13/0206 403/326 |

* cited by examiner

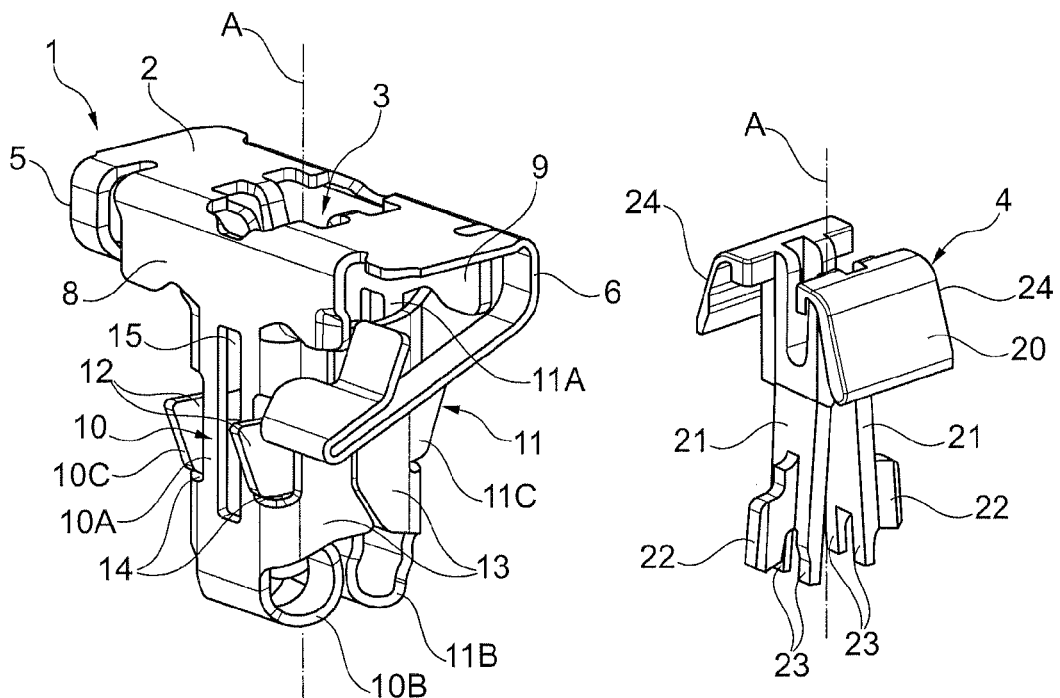
Fig. 1
Fig. 2
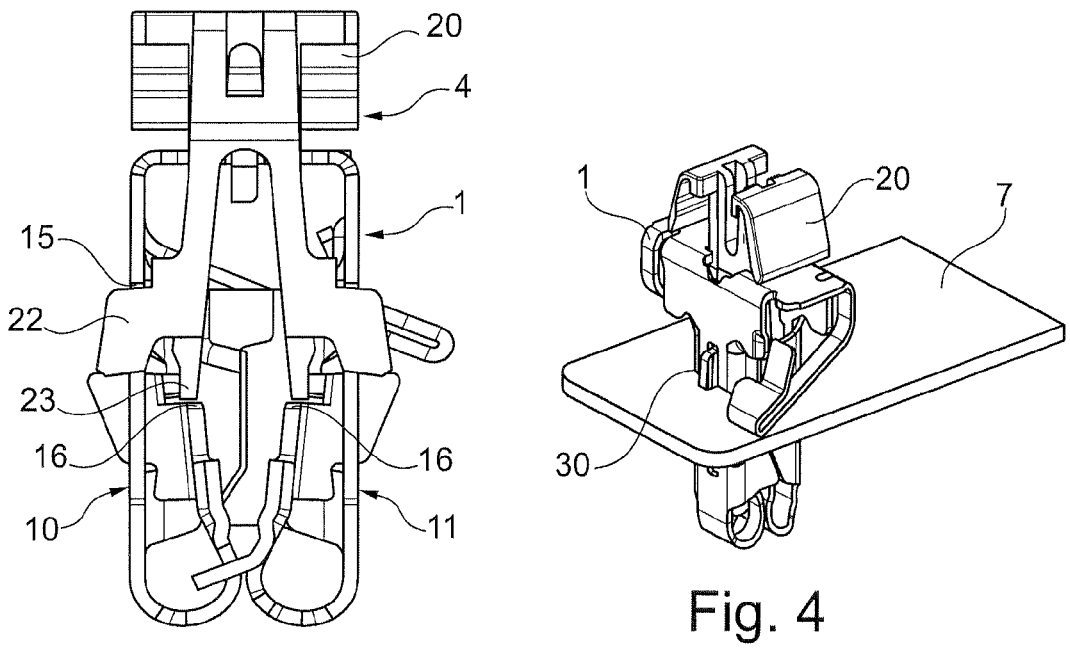
Fig. 3
Fig. 4

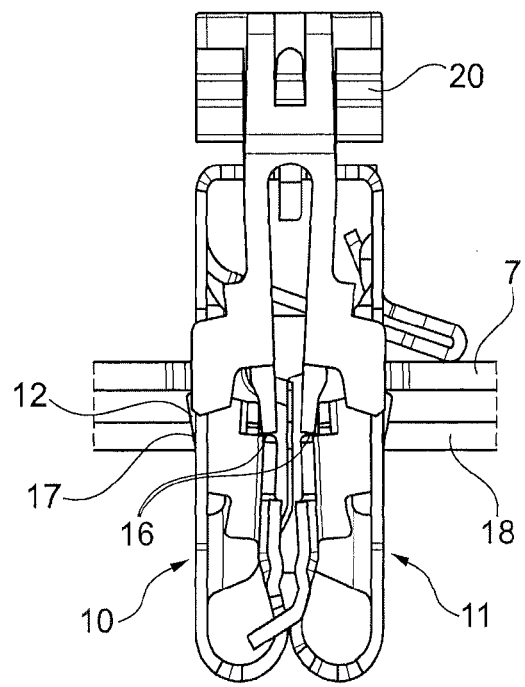
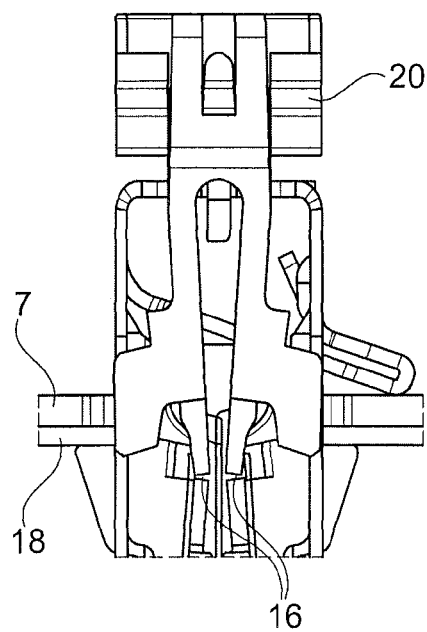
Fig. 5  Fig. 6
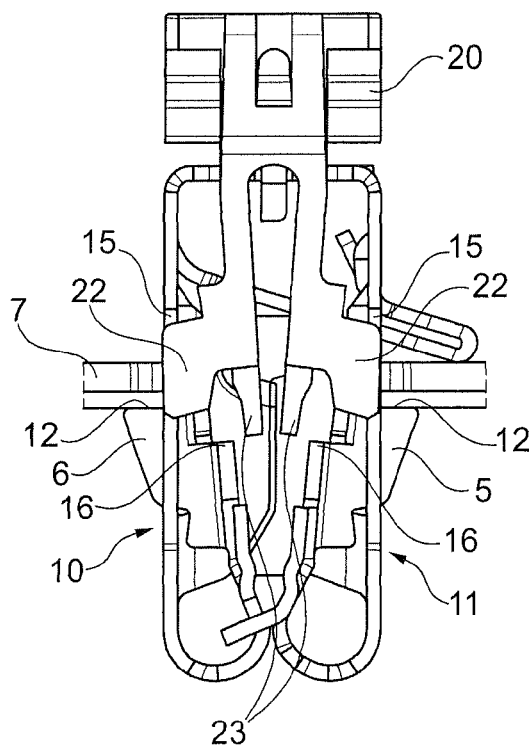
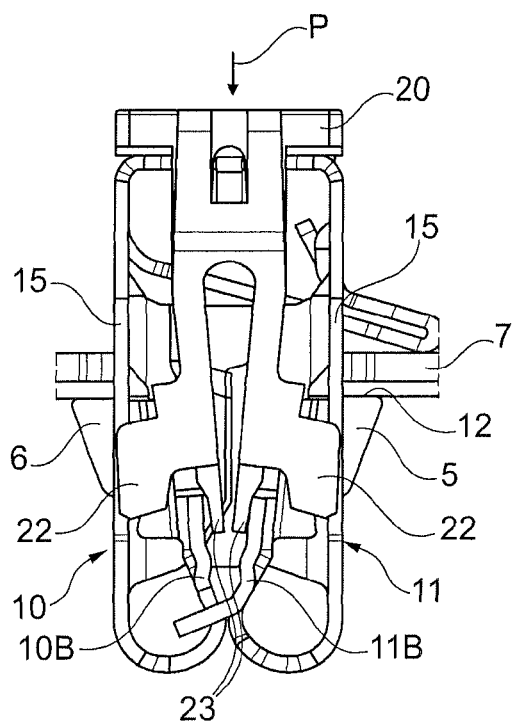
Fig. 7  Fig. 8

US 9,453,523 B2

CRAMPING FASTENER DEVICE

CROSS REFERENCE TO RELATED APPLICATION

This U.S. patent application claims the benefit of French patent application number 1453602, filed Apr. 22, 2014, the entire contents of which is incorporated herein by reference.

BACKGROUND OF THE INVENTION

1. Technical Field

The invention relates to the field of assembling structural components together by clipping them together.

The invention relates more particularly to a fastener device for assembling a part to a support portion, said fastener device comprising a fastener clip including a head and a deformable catch element that extends under the head in an axial direction, and that defines a cramping face spaced apart from the head in said axial direction, said catch element being designed to be pushed through the part and through the support portion in such a manner as to achieve assembly by cramping the part and the support portion between the head and the cramping face of the clip, said catch element being designed in such a manner that said cramping face is retracted resiliently into the clip transversely to said axial direction when the catch element is pushed through the part and through the support portion until the clip is pushed fully through the support portion, the cramping face returning resiliently to outside the clip so as to take up a cramping position for cramping to the support portion whenever the catch element is in said fully pushed-in position.

2. Prior Art

Such a fastener device is known from Patent Document DE-10 2011 010 141. That known clip fastener device is shaped in the form of a channel-section member so as to have high rigidity and so as to have high mechanical resistance to being torn out.

It is well suited to assembling an airbag to a motor vehicle steering wheel.

In the automobile industry, fastener devices that use clipping are increasingly replacing assembly systems that use nuts and bolts.

Where the problem of safety is important, such as, for example, for fastening an airbag to a fixed component of a motor vehicle, it is essential to ensure that the quality of the fastening provided by a clip fastener does indeed comply with the requirements relating to strength.

However, with clip fastener devices, it is often not simple to determine whether the device has been correctly fastened, or whether it has, for example, remained in a semi-locked state.

In many situations, e.g. when assembling an airbag to a steering wheel, establishing whether the device has been correctly fastened is made even more difficult by the fact that it is very difficult to check the states of clip fastener devices by visual observation.

Patent Document DE-10 2004 025 698 also discloses a fastener device for fastening together two structural elements by clipping that is made up both of a clipping element that can take up an engaged thrust position, and a cramping catch position, and also of a proper-assembly indicator for checking that assembly has been achieved properly. In that fastener device, the catch element and the proper-assembly indicator are coupled together in the engaged thrust position and are arranged in such a manner that movement of the proper-assembly indicator relative to the catch element in the checking direction is possible only if the catch element is in its cramping catch position.

It is thus possible to check that the structural elements are properly assembled together merely by trying to move the proper-assembly indicator in the checking direction. If such a movement is possible, that indicates that the structural elements have been properly assembled together. If that movement is not possible, that indicates that the catch element is not properly pushed into the structural elements and that it is not in a cramping catch position.

Patent document EP 2 687 731 also discloses a fastener device for fastening together two structural elements by clipping with a proper-assembly indicator for checking that assembly has been achieved properly.

SUMMARY OF THE INVENTION

An object of the invention is to provide a fastener device that has high rigidity and high mechanical resistance to being torn out, as presented above, and that includes a proper-assembly indicator that can be robust and that enables positioning in the cramping catch position to be checked reliably.

To this end, the invention provides a fastener device for assembling a part to a support portion, said fastener device comprising a fastener clip including a head and a deformable catch element that extends under the head in an axial direction, and that defines a cramping face spaced apart from the head in said axial direction, said catch element being designed to be pushed through the part and through the support portion in such a manner as to achieve assembly by cramping the part and the support portion between the head and the cramping face of the clip, said catch element being designed in such a manner that said cramping face is retracted resiliently into the clip transversely to said axial direction when the catch element is pushed through the part and through the support portion until the clip is pushed fully through the support portion, the cramping face returning resiliently to outside the clip so as to take up a cramping position for cramping to the support portion whenever the catch element is in said fully pushed-in position, said fastener device being characterized in that it further comprises a proper-assembly indicator for checking that the clip is properly assembled in the cramping position, said proper-assembly indicator being in the form of a sort of stud designed to be pushed axially into the clip, in that said indicator and said clip are designed in such a manner that, when the catch element is pushed through the support portion, the indicator is prevented from penetrating axially into the clip by an abutment on the catch element and, at the same time, the indicator is constrained to retract resiliently and transversely to said axial direction towards the inside of the clip under the effect of the cramping face retracting towards the inside of the clip, it being possible for the indicator to be pushed fully into the clip only when the cramping surface of the catch element comes fully into its cramping position for cramping the support portion from behind, the abutment on the catch element moving out of the way to allow the indicator to pass through in said axial direction.

With this arrangement, the proper-assembly indicator can start moving into the checking position in which it indicates proper-assembly only firstly on the condition that the catch element has firstly been retracted under the effect of the clip being pushed into the support part, and secondly on the condition that the support portion is still present between the head of the clip and the cramping face when the catch element has returned to its cramping position.

The fastener device of the invention may advantageously have the following features:

the indicator is made of a plastics material and the clip is made of metal;

the indicator has a head that is designed to constitute a visible or tactile indication, e.g. that is designed to deform on coming into contact with the head of the clip, when the indicator is fully pushed into the clip;

the deformable head of the indicator has a folding portion arranged to pivot when the indicator is fully pushed into the clip;

seen from above, the head of the clip is hidden at least in part by the deformable head of the indicator when the indicator is fully pushed into the clip;

seen from above, the deformable head of the indicator uncovers the head of the clip at least in part when the indicator is fully pushed into the clip; and the head of the clip is in the form of a cover plate from which two catch arms extend perpendicularly that constitute the catch element of the clip and that co-operate with the cover plate to form a channel-section member, each catch arm being curved towards the inside of the channel-section member and having a free end that forms a cramping face that projects outside the channel-section member, the indicator has at least two flexible locking tabs that extend in the axial direction between said catch arms, said locking tabs are spaced apart from each other transversely to the axial direction and each of them has a heel and a sole, and the heel of each locking tab is designed to snap-fasten into a slot extending in the axial direction in the catch element while the sole of each locking tab is designed to come into axial abutment against a catch arm.

It can thus be understood that, with this arrangement, the cramping position enables the catch arms of the clip to return resiliently to outside the clip so that the catch arms are not stressed when cramping is achieved. The catch arms of the clip are thus in the same position before and after cramping. The only stress that is exerted on the clip after cramping is the stress that is exerted on the flexible fingers that flex so as to hold the part and the support portion clamped together in the cramping position.

With the arrangement of the clip of the invention, it is still possible to disengage the clip from the support portion before the clip is fully pushed into the support portion, without any risk of the proper-assembly indicator starting to penetrate further than is possible in the pre-assembly position into the catch element, and, in addition, it is possible to pre-assemble the proper-assembly indictor in the clip without any risk of the proper-assembly indicator separating from the clip easily.

If the clip comes out of the support portion before the clip is fully pushed into the support portion, the proper-assembly indicator is in an intermediate position in which the flexible tabs of the indicator have come closer together and the flexible tabs of the indicator can move apart again without, however, being pushed into the clip because it is the cramping faces of the clip that control the spacing between the flexible tabs of the indicator and not the edge of the opening in the support part, thereby contributing to obtaining good reliability for the proper-assembly indicator.

When the indicator is pushed into, or partially pushed into, the clip, then it might not be possible to remove the clip from the support portion without first pulling the proper-assembly indicator manually towards the outside of the clip.

The fastener device of the invention is well suited for coupling together by assembling together an airbag and a fixed component of a motor vehicle such as a steering wheel, a dashboard, or a roof frame.

The fastener device of the invention may be used to fasten by assembly other elements of a motor vehicle such as a sun visor, a door handle, door trim, etc.

BRIEF DESCRIPTION OF THE DRAWINGS

In the drawings:

FIG. 1 is a perspective view of a first embodiment of a clip of the fastener device of the invention;

FIG. 2 is a perspective view of an embodiment of the proper-assembly indicator specially adapted to be inserted into the clip of the fastener device shown in FIG. 1;

FIG. 3 is a longitudinal section view of the proper-assembly indicator shown in FIG. 2, when it is pushed in partially to the pre-assembly position in the clip shown in FIG. 1;

FIG. 4 is a perspective view of the fastener device of the invention in a pre-assembly state in which the clip is pushed into the part to be assembled only, and the proper-assembly indicator is pushed in partially, into the pre-assembly position, in the clip;

FIG. 5 is a longitudinal section view of the proper-assembly indicator as pushed in partially into the pre-assembly position in the clip, and as retracting under the effect of the catch element of the clip retracting when said clip is pushed in partially into the support portion;

FIG. 6 is an enlarged longitudinal section view that shows the relative position of the proper-assembly indicator and of the clip just before the catch element of the clip is resiliently released;

FIG. 7 is a longitudinal section view of the catch element that is in its cramping position after being resiliently released, while the flexible tabs of the proper-assembly indicator are held retracted into the clip by contact with the support portion;

FIG. 8 is an enlarged longitudinal section view that shows the proper-assembly indicator as fully inserted into the clip;

DESCRIPTION OF EMBODIMENTS

Figure 9:
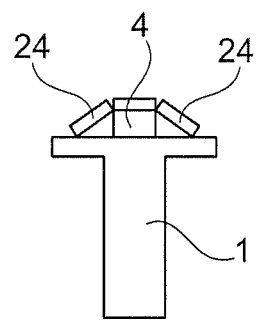
FIGS. 9 and 10 are views of respective ones of two different shapes that can be taken up by the deformable head of the proper-assembly indicator in order to indicate that the connection coupling has been established correctly.

FIG. 1 shows an embodiment of a fastener device of the invention having a clip 1 that, in this example, is formed by folding a metal sheet.

The clip 1 has a head that is in the form of a cover plate 2, which, in this example, is essentially rectangular in shape.

The cover plate 2 is provided with a central hole 3 through which the proper-assembly indicator 4 shown in FIG. 2 is designed to be inserted.

The cover plate 2 is extended at two opposite ends by two flexible fingers 5 and 6 that are curved back under the plane of the cover plate 2 and away from the head of the clip so as to serve as bearing faces, which are opposite from the cramping faces of the clip.

In the example shown in FIG. 1, the two fingers 5 and 6 are aligned and extend in opposite directions on two opposite sides of the cover plate.

Two outer side walls 8 and 9 extend from the longitudinal edges of the cover plate 2 perpendicularly thereto.

The two walls 8 and 9 and the cover plate 2 co-operate to form a channel-section member, thereby imparting excellent rigidity to the clip. The flanges of the channel section extend in an axial direction A and form the catch element of the clip.

As shown in FIG. 1, each side wall, such as the wall 8, is flanked at one end by the base of a finger (finger 5 in FIG. 1), and at the other end by the free end of the other finger, the movement of each finger thus being limited, in this example, by a notch in a side wall of the clip.

In their middles, the side walls 8, 9 form respective ones of two catch arms 10, 11 of width less than the length of the walls, each of which arms is curved back towards the inside of the channel-section member.

More particularly, each catch arm (10 or 11) comprises a first portion of length of arm (10A or 11A) that extends perpendicularly to the plate 2 in alignment with the side wall 8, a second portion of length of arm (10B or 11B) that extends the first portion of length of arm (10A or 11A) and that is curved back towards the inside of the section member and that comes back to overlap the first portion of length of arm (10A or 11A), and a third portion of length of arm (10C or 11C) that extends the second portion of arm (10B or 11B) outside the channel-section member to form a cramping face 12 of the clip 1 that is opposite from the bearing faces of the fingers 5 and 6.

As can be seen in FIG. 1, in this example, each arm 10 and 11 splits into two branches at the second and third portions of length of arm, the two branches of each catch arm passing across the corresponding first portion of length of arm from one side to the other so as to form two cramping faces 12 on one side of the clip.

The two arms 10 and 11 are thus curved symmetrically relative to each other, thereby enabling the third portion of length of arm forming the cramping face to move towards the inside of the clip.

More particularly, the cramping faces can retract resiliently towards the inside of the channel section of the clip under the action of a thrust force that is exerted transversely to the side walls 8 and 9.

As shown in FIG. 1, the first portion of length 10A, 11A of each arm is flanked on either side by an edging cheek 13 that imparts to the clip 1 a block-shaped construction that is very resistant to high tear-out forces.

In each side wall 10 and 11, first longitudinal slots 14 are provided, through each of which the free end of the third portion of length 10C, 11C of a corresponding catch arm passes.

In addition, in the example shown in FIG. 1, longitudinal slots 15 are provided in which the proper-assembly indicator 4 comes to be snap-fastened when it is pushed into the clip 1 in the pre-assembly position. This snap-fastening of the indicator in the slot prevents the indicator from being easily disengaged from the clip.

FIG. 2 shows an embodiment of the proper-assembly indicator 4 that, in this example, is made of a molded plastics material that is quite rigid.

As shown in FIG. 2, the indicator 4 is in the form of a sort of stud, i.e. with a body that is elongate in overall shape, and that extends in the axial direction A, with a head 20 that, in this example, is deformable and under which, in this example, two flexible locking tabs 21 extend. In this example, the indicator is elongate and generally in the shape of an upside-down U-shape.

As shown in FIG. 2, each locking tab 21 has a free end in the form of a shoe with a heel 22 and a sole 23 that is split in two.

The proper-assembly indicator 4 is elastically deformable inwards due to the locking tabs 21 being spaced apart from each other transversely to the axial direction A, and thus being adapted to retract or to come closer together resiliently.

As can be seen in FIGS. 1 and 2, the opening 3 in the cover plate 2 has an outline that is complementary to the peripheral outline of the indicator 4 at its bottom portion when the two locking tabs 21 are brought close together.

FIG. 3 shows the proper-assembly indicator 4 as pushed in partially into the clip 1.

As shown in FIG. 3, the shoe 22 of each locking tab is snap-fastened into the slot 15 in a side wall 10 of the clip so as to retain the indicator in the clip while the free end of the sole 23 (split in two) comes into abutment on an edge face 16 of a catch arm, thereby preventing the indicator from penetrating any further axially into the clip.

FIG. 4 shows the clip 1 and the proper-assembly indicator 4 as pre-positioned in the part 7 to be assembled.

In this example, the part 7 is a plane portion forming a plate, e.g. a strip of fabric or a metal plate, or a plastics plate that is part of an airbag.

The part 7 is shown in FIG. 4 with an opening 30 that is of substantially rectangular shape that is complementary to the rectangular peripheral outline of the clip 1.

In addition, in this example, the opening 30 is provided with two opposite notches for allowing the shoes to pass through in contactless manner when necessary with the shoes 22 then projecting out of the clip through the slots 15.

This part 7 is held between the bearing faces of the head of the clip and the cramping faces 12 of the catch arm 10 and 11.

As shown in FIG. 5, the part 7 is designed with a thickness such that the part 7 comes to fit between the bearing faces of the head 1 and the cramping faces 12 with a small amount of clearance.

In FIG. 5, the catch element constituted by the catch arms 10 and 11 is pushed in partially into an opening 17 in the support part 18 which, in this example, is a fixed component of a motor vehicle, such as a steering wheel.

The opening 17 has an outline that fits the peripheral outline of the clip and does not have any notches. More particular, by pushing the clip 1 into the opening 17 in the support portion 18, the edge of the opening 17 is caused to exert pressure on the free ends 10C, 11C of the catch arms, which free ends project through the slots 14 and out of the clip, this pressure tending to bring the catch arms closer together, i.e. to cause the cramping faces 12 to retract towards the inside of the clip.

The locking tabs 21 of the indicator are arranged in such a manner as to retract (i.e. as to move closer together) resiliently towards the inside of the indicator in reaction to the cramping faces 12 retracting towards the inside of the clip, but, at the same time they come into abutment against the edge faces 16 of the catch arms, thereby preventing the indicator 4 from penetrating axially into the clip.

In FIG. 6, the catch element of the clip is fully pushed into the part 7 and also into the support portion 18. It should be noted that, in this pushed-in state, the edge of the opening 17 comes to close off the slots 15 in the outer walls of the clip.

In FIG. 7, the cramping faces have returned resiliently to their rest position, the free ends 10C, 11C of the catch arms projecting once again through the slots 14. The catch element is thus in its cramping position in which it cramps the support portion 18 from behind.

The locking tabs of the proper-assembly indicator abut in the slots 15 against the edge of the opening 17 in the support portion but they are no longer prevented from moving axially by the edge faces 16 of the catch arms that have moved out of the way by moving towards the outside of the clip.

Under the effect of the thrust force for pushing the clip into the support portion, which force is represented by arrow P in FIG. 8, the proper-assembly indicator 4 can leave the level of penetration into the clip that corresponds to the pre-assembly position and can therefore penetrate fully into the clip, the heel 22 of the shoe sliding in the slot 15, while the soles 23 of the shoe 23 come to jam between the portions of length of arm 10B, 11B of the catch arms.

The head 20 of the proper-assembly indicator 4 is designed so that when it is in its fully pushed-in position in which it is fully pushed into the clip, it constitutes a visible or tactile indication that the clip is properly assembled in its cramping position in which it is cramped to the support portion 18 from behind. In particular, provision may be made for the head of the proper-assembly indicator to engage fully into the head of the clip so that it comes flush therewith, thereby constituting both a visible indication and a tactile indication.

In the example of the fastener device that is shown in FIGS. 2 to 8, the head 20 of the indicator 4 is deformable and is designed to deform on coming into contact with the head of the clip, which, in this example, is the cover plate 2, when the indicator is fully pushed in axially into the clip.

The deformable head 20 of the proper-assembly indicator 4 may, for example, be designed with two hinged flaps 24 as shown in FIG. 2.

In FIGS. 7 and 8, it can be understood that the flaps 24 of the head of the indictor 4 pivot when the indicator is pushed fully into the clip. Seen from above, the head of the clip is hidden at least in part by the flaps 24, which are flattened out.

Figure 10:
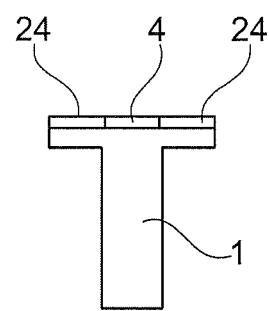

In FIGS. 9 and 10, the two indication states of the indicator depending on its position in the clip can be observed from the highly diagrammatic views of the flaps 24.

Figure 11:
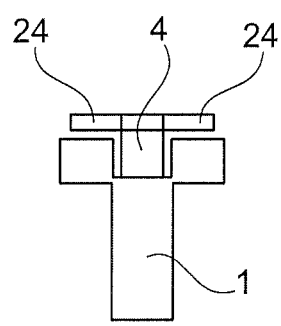
FIGS. 11 and 12 are views of respective ones of two other different shapes that can be taken up by the deformable head of the proper-assembly indicator in order to indicate that the connection coupling has been established correctly.
Figure 12:
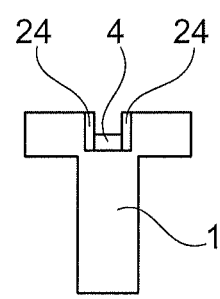

In a variant, it is possible to design an indicator head with flaps 24 that stand up when the indicator is fully pushed into the clip, i.e. the head of the indicator then uncovers the head of the clip, at least in part. In FIGS. 11 and 12, two other indication states of the indicator depending on its position in the clip can be observed from the highly diagrammatic views of the flaps 24.

Figure 13:
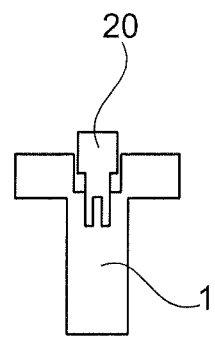
FIGS. 13 and 14 are views of respective ones of two other different shapes that can be taken up by the deformable head of the proper-assembly indicator.
Figure 14:
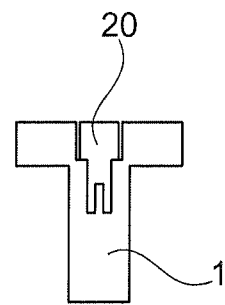

In yet another variant shown in FIGS. 13 and 14, two indication states of the indicator depending on its position in the clip 1 can be observed, with the indicator head 20 being non-deformable. When the indicator is fully pushed into the clip (FIG. 14), the head 20 of the indicator is retracted completely, in this example, into a setback in the cover plate 2 of the clip 1.

The fastener device of the invention contributes to checking that an airbag and a fixed component of a motor vehicle are properly assembled together by means of a clip for fastening by cramping.

Proper assembly can be checked by an automatic detection system that uses imaging. It is also possible for proper assembly to be checked in tactile manner by an operator on an assembly line.

Naturally, the fastener device of the invention as described above and shown in the drawings is merely an embodiment, and naturally the invention may extend to other forms of clip and to other forms of proper-assembly indicator.

What is claimed is:

1. A fastener device for assembling a part to a support portion, said fastener device comprising a fastener clip including a head and a deformable catch element that extends under the head in an axial direction, and that defines a cramping face spaced apart from the head in said axial direction, said catch element being designed to be pushed through the part and through the support portion in such a manner as to achieve assembly by cramping the part and the support portion between the head and the cramping face of the clip, said catch element being designed in such a manner that said cramping face is retracted resiliently into the clip transversely to said axial direction when the catch element is pushed through the part and through the support portion until the clip is pushed fully through the support portion, the cramping face returning resiliently to outside the clip so as to take up a cramping position for cramping to the support portion whenever the catch element is in said fully pushed-in position, said fastener device being characterized in that it further comprises a proper-assembly indicator for checking that the clip is properly assembled in the cramping position, said proper-assembly indicator being in the form of a sort of stud designed to be pushed axially into the clip, in that said indicator and said clip are designed in such a manner that, when the catch element is pushed through the support portion, the indicator is prevented from penetrating axially into the clip by an abutment on the catch element and, at the same time, the indicator is constrained to retract resiliently and transversely to said axial direction towards the inside of the clip under the effect of the cramping face retracting towards the inside of the clip, it being possible for the indicator to be pushed fully into the clip only when the cramping surface of the catch element comes fully into its cramping position for cramping the support portion from behind, the abutment on the catch element moving out of the way to allow the indicator to pass through in said axial direction.

2. The device according to claim 1, characterized in that the indicator is made of a plastics material and the clip is made of metal.

3. The device according to claim 1, characterized in that the indicator has a head that is designed to constitute a visible or tactile indication when the indicator is fully pushed into the clip.

4. The device according to claim 3, characterized in that the indicator has a deformable head that is designed to deform on coming into contact with the head of the clip when the indicator is fully pushed into the clip.

5. The device according to claim 4, characterized in that the deformable head of the indicator has a folding portion arranged to pivot when the indicator is fully pushed into the clip.

6. The device according to claim 5, characterized in that, seen from above, the head of the clip is hidden at least in part by the deformable head of the indicator when the indicator is fully pushed into the clip.

7. The device according to claim 5, characterized in that, seen from above, the deformable head of the indicator uncovers the head of the clip at least in part when the indicator is fully pushed into the clip.

8. The device according to claim 1, characterized in that the head of the clip is in the form of a cover plate from which two catch arms extend perpendicularly that constitute the catch element of the clip and that co-operate with the cover plate to form a channel-section member, each catch arm being curved towards the inside of the channel-section member and having a free end that forms a cramping face that projects outside the channel-section member, in that the indicator has at least two flexible locking tabs that extend in the axial direction between said catch arms, in that said locking tabs are spaced apart from each other transversely to the axial direction and each of them has a heel and a sole, and in that the heel of each locking tab is designed to snap-fasten into a slot extending in the axial direction in the catch element while the sole of each locking tab is designed to come into axial abutment against a catch arm.

9. The device according to claim 1, characterized in that the part is an airbag and the support portion is a fixed component of a motor vehicle.

* * * * *